United States Patent [19]

Uhlmann

[11] 3,710,284

[45] Jan. 9, 1973

[54] HARMONIC FILTER

[75] Inventor: Erich Uhlmann, Ludvika, Sweden

[73] Assignee: Allmanna Svenska Elektriska Aktiebolaget, Vasteras, Sweden

[22] Filed: March 1, 1971

[21] Appl. No.: 119,730

[52] U.S. Cl. ..........................333/75, 333/76, 333/79
[51] Int. Cl. ..............................................H03h 7/04
[58] Field of Search........................333/70, 75, 76, 79

[56] References Cited

UNITED STATES PATENTS 2,660,712 11/1953 Landon ..............................333/77 X

*Primary Examiner*—Herman Karl Saalbach
*Assistant Examiner*—Marvin Nussbaum
*Attorney*—Jennings Bailey, Jr.

[57] ABSTRACT

A harmonic filter is connected between two conductors joining a harmonic source to a network. The filter is composed of two impedance devices each including at least one impedance element, the impedance elements being either beoth inductive or both capacitative. One of the impedance devices is connected as a series element in one of the conductors, while the other impedance device is connected to the other of the conductors and an output of the first impedance device. There is a blocking circuit for the current of the network which forms a part of the second impedance device.

5 Claims, 7 Drawing Figures

INVENTOR.

ERIC UHLMANN

BY

HARMONIC FILTER

BACKGROUND OF THE INVENTION

1. Field of the Invention

The present invention relates to a harmonic filter connected between two conductors in a network to short-circuit harmonic currents in the network and consisting of two impedance elements, the impedances of which may have inductive or capacitive character.

2. The Prior Art

Such harmonic filters are used, for example, in connection with static converter stations to short-circuit harmonics generated by the converters of the station. Conventional filters usually consist of a number of parallel-connected series resonance circuits, each tuned for one or more of the harmonics to be short-circuited, so that low impedance leakage current paths are obtained for the harmonics. However, as will be shown later, the filter action not only depends on the filter impedance, but also on the impedance of the network to be protected against the harmonics, so that, with a low network impedance, part of the harmonic current leaks out into the network even if the filter is well tuned.

It may also be said that the filter action of the known filters permits the filter to allow through all current — preferably the basic current — which is not effectively short-circuited in the filter and the effectiveness of this short-circuiting depends in turn on the ratio between network impedance and filter impedance, a ratio which it is not easy to control, and the efficiency of the filter may thus be less satisfactory.

SUMMARY OF THE INVENTION

This problem is avoided with the filter according to the present invention which is designed to short-circuit all currents except the one which is directly blocked, that is the basic current.

Whereas the series resonance circuits in the known filters include impedance elements of different characters, both inductive and capacitive, a filter according to the invention consists of two impedance elements of the same character, that is both inductive or both capacitive, and one of these impedance elements is connected as a series element in one of the conductors while the second impedance element is connected between the second conductor and an output on the first element and includes a blocking circuit for the basic current of the network.

Thus, such a filter contains only one short-circuiting path, contrary to the known type of filter which contains a number of parallel paths, and, since the filter according to the invention short-circuits all currents except the basic currents, it will also short-circuit harmonic currents of unknown or unexpected character and magnitude, whereas the known filter can only short-circuit those harmonic currents for which it is intended.

The first impedance element is suitably designed as an inductive current distributor connected in parallel with a reactive impedance element which may then be inductive or capacitive.

BRIEF DESCRIPTION OF THE DRAWINGS

The invention will be further described with reference to the accompanying drawings in which, FIG. 1 shows a harmonic filter of a type known per se, whereas.

DESCRIPTION OF THE PREFERRED EMBODIMENTS

Figure 1:
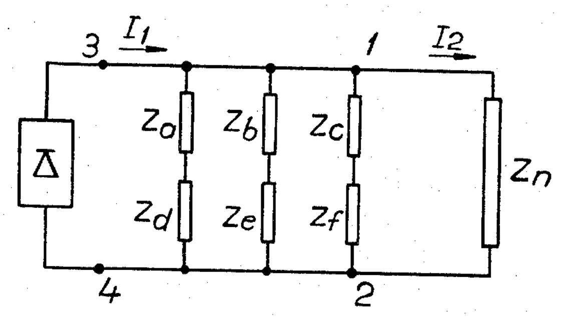

FIG. 1 shows a harmonic filter connected between two AC conductors 1 and 2 and consisting of a number of series resonance circuits, each tuned for one or more harmonics and consisting of two series-connected impedance elements $Z_{a,b,c}$ and $Z_{d,e,f}$, respectively, one of which is preferably inductive and the other preferably capacitive. The conductors 1 and 2 are connected over terminals 3 and 4 to a harmonic source, for example a converter station 5 and a network with the impedance $Z_n$ is connected to the conductors 1 and 2. The relationship between the total harmonic current $I_1$ through the input terminals 3 and 4 and the harmonic current $I_2$ which leaks out into the network $Z_n$ is, according to a simple calculation for a certain filter circuit and the corresponding harmonic, $$I_2/I_1 = (Z_a + Z_d)/(Z_a + Z_d + Z_n)$$

If the filter is well tuned, $Z_a$ and $Z_d$ will be almost the same as each other with opposite signs and the total impedance $Z_a + Z_d$ will be low. However, it obviously cannot be infinitely low, partly because the filter should not have too high a factor of merit, see for example U.S. Pat. No. 3,501,686. If, therefore, $Z_n$ is not extremely large in relation to said total impedance, the harmonic current $I_2$ will not be negligible.

Figure 2:
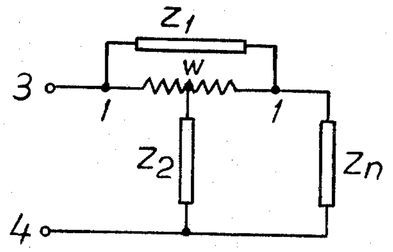
FIG. 2 shows purely in principle a filter according to the invention.

A considerable improvement in this relationship is achieved according to the invention by means of the connection shown in FIG. 2 in which one of the impedance elements, $Z_1$ is arranged in series with the conductor 1, while the other impedance element, $Z_2$, is connected to an output on $Z_1$. In FIG. 2 this output is arranged on an inductive current distributor W connected in parallel with the impedance element $Z_1$, which, together with element $Z_1$, forms an impedance means on an output of which the element $Z_2$ is connected.

Figure 3:
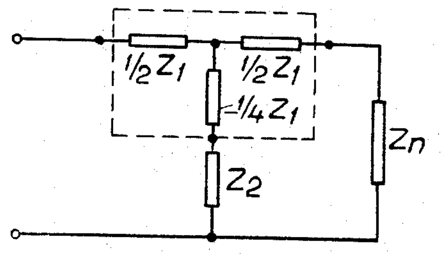
FIG. 3 shows an equivalent diagram for FIG. 2 and FIGS. 4 – 7 show various detailed embodiments of the filter according to FIG. 2.

A calculation of this connection shows that it is equivalent to the diagram shown in FIG. 3 where the impedance element $Z_1$ is divided into a T connection, the two upper branches having the impedance $\frac{1}{2}Z_1$ while the middle branch has a negative impedance $-\frac{1}{4}Z_1$. A calculation of the current conditions in this connection gives $$I_2/I_1 = (Z_2 - 1/4Z_1)/(Z_2 + 1/4Z_1 + Z_n)$$

In this case the numerator will be the difference between two impedances, while the denominator will be the sum of three impedances. For the numerator to be zero, $Z_1$ and $Z_2$ must have the same character, that is, both be inductive or both capacitive. The denominator will therefore certainly deviate from zero when the numerator approaches zero so that in this case the harmonic current $I_1$ in the network $Z_n$ can be completely avoided. In FIG. 3 it is assumed that the output is placed in the middle of W. However, there is nothing to prevent the output being moved in one direction or the other, in which case the current ratio is slightly altered.

Figure 4:
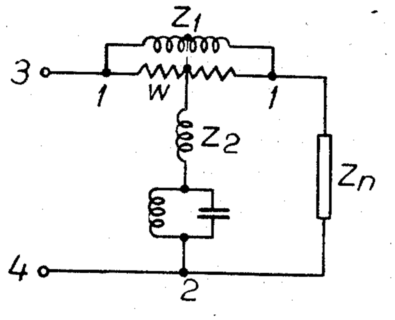
Figure 5:
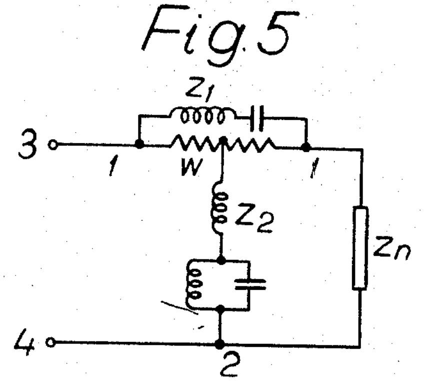
Figure 6:
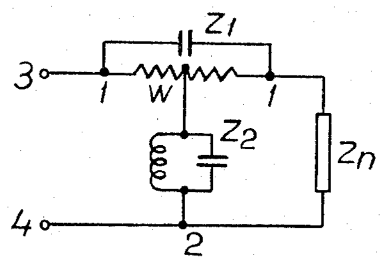

Since $Z_1$ and $Z_2$ are of the same type, there is no tuning of the filter for the various harmonics. It short-circuits all frequencies. There must thus be a blocking circuit in the second element which may suitably be designed as a parallel resonance circuit tuned for the basic frequency of the network. FIGS. 4 – 6 show such parallel resonance circuits in the impedance element $Z_2$.

In FIGS. 4 and 5, $Z_1$ and $Z_2$ are preferably both inductive. Furthermore, in FIG. 5, $Z_1$ is designed as a series resonance circuit tuned for the basic frequency of the network so that $Z_1$ at the same time acts as a block for harmonics. In FIG. 6, $Z_1$ and $Z_2$ are preferably capacitive. In FIG. 4 the current distributor W may be omitted, the output being then arranged on the reactor $Z_1$ itself.

Figure 7:
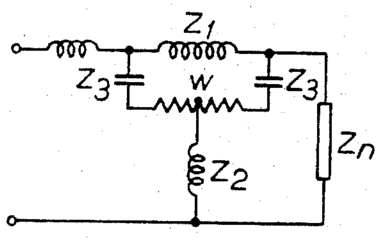

The filter in FIG. 7 is intended for the DC side of a static converter and the series impedance $Z_1$ in the conductor 1 is therefore purely inductive while the shunt impedance $Z_2$ is tuned for the harmonics of the direct current, the so-called ripple frequency. The capacitors $Z_3$ thus act as a total block for the direct current having the frequency zero. The capacitors $Z_3$ may be replaced by a single capacitor, for example between W and $Z_2$, but with $Z_3$ in the position shown W will be insulated from the direct current which would otherwise result in excitation of W.

As used in the claims, the statement that the impedances are of similar character means that they are both inductive or both capacitative.

I claim:

1. Harmonic filter comprising two conductors which join a current source to a network for delivering a certain basic current to said network; said filter suppressing harmonics or ripple in the current, said filter comprising first and second impedance means each comprising at least one impedance element, the resultant impedance of which may have inductive or capacitive character, the first impedance means being connected as a series element in one of said conductors and having an intermediate tapping, the second impedance means being connected between the second conductor and the intermediate tapping on the first impedance means, the resultant impedance of said two impedance means having the same character and the second impedance means including a blocking circuit for the basic current of the source, the parts of the first impedance means on opposite sides of said intermediate tapping being mutually inductively coupled.

2. A filter according to claim 1 in which said blocking circuit comprises a parallel resonance circuit tuned to the basic frequency of the filter.

3. A filter according to claim 1, in which said first impedance means comprises an inductive current divider parallel connected with the impedance element of the first impedance means; said current divider being provided with an intermediate tapping, said second impedance means being connected between said tapping and said second conductor.

4. A filter according to claim 1, which is intended for a DC network, in which said blocking circuit of said second impedance means comprises a capacitance in series with an impedance element, said impedance element being inductive.

5. A filter according to claim 4, in which said series capacitance of said second impedance means is inserted between an inductive current divider and an impedance element in said first impedance means.

* * * * *